(12) United States Patent
Bergeron

(10) Patent No.: US 6,568,099 B2
(45) Date of Patent: May 27, 2003

(54) TAPERULE BLADE FRICTION TAB

(76) Inventor: James Bergeron, 1 Horseshoe Dr., Derry, NH (US) 03038

( * ) Notice: Subject to any disclaimer, the term of this patent is extended or adjusted under 35 U.S.C. 154(b) by 0 days.

(21) Appl. No.: 09/976,218

(22) Filed: Oct. 12, 2001

(65) Prior Publication Data

US 2003/0070315 A1 Apr. 17, 2003

(51) Int. Cl.7 .................................................. G01B 3/10
(52) U.S. Cl. ........................................... 33/770; 33/758
(58) Field of Search ........................ 33/770, 755, 757, 33/758, 759, 760, 768

(56) References Cited

U.S. PATENT DOCUMENTS

| | | | | |
|---|---|---|---|---|
| 3,192,630 A | * | 7/1965 | Dineson | 33/760 |
| 5,077,911 A | * | 1/1992 | von Wedemeyer | 33/770 |
| 5,402,583 A | * | 4/1995 | Komura | 33/758 |
| 5,746,004 A | * | 5/1998 | Wertheim | 33/768 |
| 6,108,926 A | * | 8/2000 | Fraser et al. | 33/758 |
| 6,442,863 B1 | * | 9/2002 | Poineau et al. | 33/755 |

FOREIGN PATENT DOCUMENTS

| | | | | |
|---|---|---|---|---|
| GB | 2223586 A | * | 4/1990 | G01B/3/10 |
| JP | 06147802 A | * | 5/1994 | G01B/3/10 |

* cited by examiner

Primary Examiner—Christopher W. Fulton
(74) Attorney, Agent, or Firm—Davis & Bujold, P.L.L.C.

(57) ABSTRACT

An improved friction tab or clip for a blade catch at an end of the tape measure blade. The friction tab is provided with an outer coating of a substantially soft, resilient and pliant material generally a soft, non-skid material, e.g. an elastomeric material, such as rubber or other similar non-skid material. The friction tab is removably mounted to the blade catch by appropriately molding an inner pocket which frictionally engages the blade catch directly. A protrusion may also be provided in the inner pocket which engages at least an aperture through the blade catch of the measuring tape to further secure the friction tab to the blade catch.

8 Claims, 6 Drawing Sheets

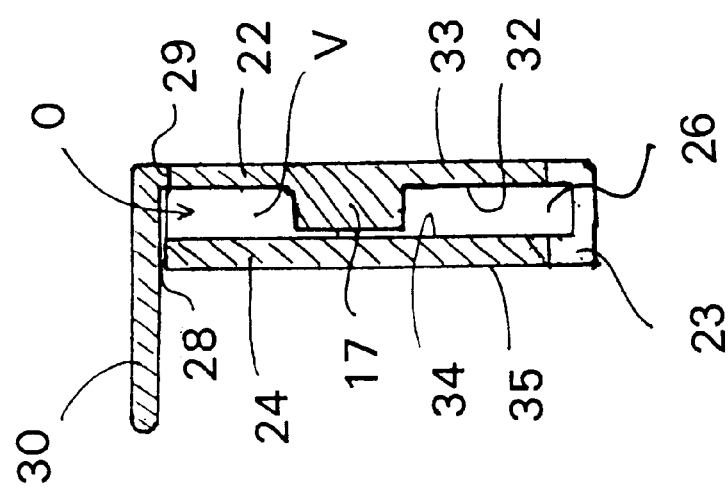
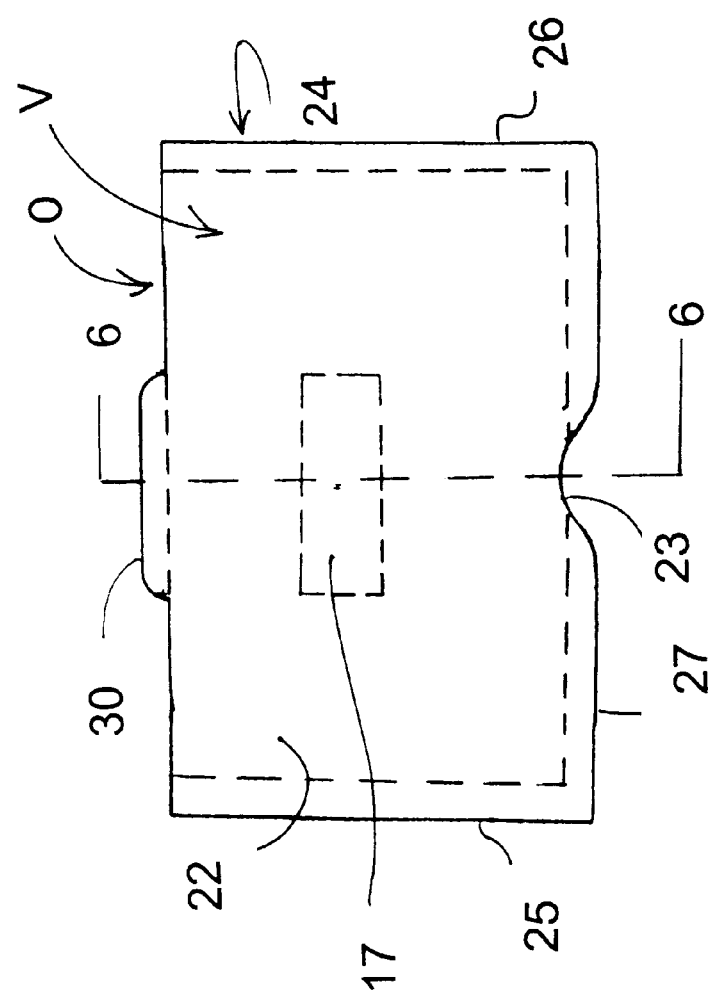
Fig. 6
Fig. 5

TAPERULE BLADE FRICTION TAB

FIELD OF THE INVENTION

The present invention relates to a friction tab for use with a measuring tape, in particular the friction tab is for use with a tape rule blade catch, for improving the frictional qualities and the operational ease of any conventional tape rule measure. The friction tab is a removable sheath or cover which may be inserted and removed from over the blade catch depending from the leading edge of the tape measure blade. The friction tab defines an inner pocket from wherein the blade catch may be inserted and removed whenever necessary. Also, a protrusion is provided within the inner pocket of the tab to engage with an opening or detent traditionally provided in the face of the blade catch of a conventional tape measure, and a finger tab may be provided on an outer portion of the tab to facilitate the insertion and removal of the tab from the blade catch.

BACKGROUND OF THE INVENTION

It is well known in the construction industry, as well as by most persons who have ever used a builders type retractable tape measure, that at the lead end of a substantially flexible, and bendable measuring rule blade, a catch, clip or stop is provided to engage a desired edge of a surface to be measured. The catch depends from the lead end of the blade at a substantially 90° angle so as to facilitate engagement of the blade catch on an edge of a particular surface or object to be measured with the tape rule. It is well known in the art that a blade catch is usually made of metal or plastic and fastened to the lead end of the tape blade by a series of rivets. The tape catch is generally a relatively small 90° piece of stamped metal having one of the 90° legs riveted to the blade end such that the free end of the catch depends at a 90° angle from the substantially planar surface defined by the measuring blade.

It is also well known that during use of conventional retractable tape measuring devices, substantial difficulty can arise in maintaining the blade catch over a desired edge of a surface particularly due to the substantially smooth frictionless surface of the metal or plastic blade catch and the object being measured. For instance, in certain situations, the blade catch is hooked over the edge of a substantially smooth planar surface and the initially retracted tape rule blade is pulled out and the further the tape body is pulled from the lead end, i.e. where the blade catch engages the edge of the object being measured, the less control the operator has over continued relative positioning of the blade catch on the surface edge. In certain situations a substantial dislocating, force on the tape blade itself can cause the catch to easily slid off or disengage from the edge around which it is hooked and therefore the tape measure can recoil and lose its ability to provide an adequate measurement.

In certain other situations, for instance measuring the length of a wall between two corners of a room, when the front end of the blade catch is pressed into one corner, the front end of the blade catch may have difficulty remaining in the corner if any external dislocating forces are inadvertently applied which would cause the blade catch to slip relative to the surface on which it is engaged. In such cases the catch may slip or be pushed forward and due to the flexibility of the tape measuring blade, the blade is bent or sent askew relative to the length being measured and thus an inaccurate measurement may obtained.

SUMMARY OF THE INVENTION

The object of the present invention is to provide a removable friction tab for the blade catch of a retractable tape measure which can be easily attached and detached from the blade catch by an operator.

Another object of the present invention is to provide a friction tab which, once attached to the blade catch of the measuring tape, engages the blade catch so that conventional and ordinary use will not detach the friction tab from the blade catch.

A further object of the present invention is to provide an economical and easy to produce friction tab which assists the user of a conventional tape measure in maintaining the blade catch on the edge of a object or surface being measured.

A still further object of the present invention is to provide the friction tab with sufficient frictional engagement with the blade catch as well as a detent for engaging with conventional detent holes in the blade catch of the measuring tape.

Another object of the present invention is to provide a blade catch made of a resilient material and having a surface texture such that it provides substantial frictional engagement with the edge of any surface being measured.

The present invention relates to an improved tape measure having an improved friction tab or clip on an end of the tape measure blade. The friction tab is provided with an outer coating of a substantially soft, resilient and pliant material generally a soft, non-skid material, e.g. an elastomeric material, such as rubber or other similar non-skid material. The friction tab is advantageously removably mounted to the blade catch by appropriately molding an inner pocket which frictionally engages the blade catch directly. A protrusion may also be provided in the inner pocket which engages at least an aperture through the blade catch of the measuring tape.

The soft skid resistant material of the friction tab prevents the tape measure blade catch from slipping off an edge of the object used to hold the blade catch during measurement and the soft nature of the material prevents any harm to the surface or edge of the object. The construction of the friction tab and the molding method used to produce it are cost efficient and effective in producing an easy to use inexpensive product.

Additional advantages and other features of the invention will be set forth in part in the description which follows and, in part, will become apparent to those having ordinary skill in the art upon examination of the following or may be learned from the practice of the invention. The advantages of the invention may be realized and obtained as particularly pointed out in the appended claims.

BRIEF DESCRIPTION OF THE DRAWINGS

FIG. 2(*b*) is a perspective view of a friction tab;

FIG. 5 is a front elevational view;

FIG. 6 is a cross-sectional side view of the friction tab;

FIG. 7(*b*) is a top planar view of the blade catch measuring tape blade and friction tab.

DETAILED DESCRIPTION OF THE INVENTION

Figure 1:
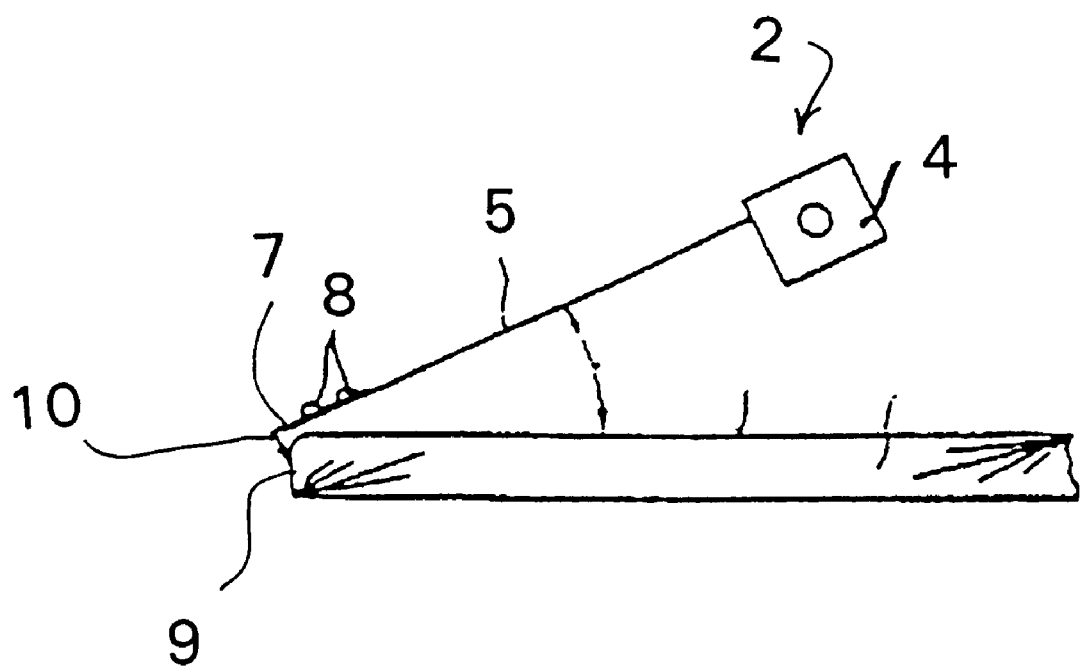
FIG. 1 is an elevational view of a conventional tape measure in use with an object being measured.
Figure 2A:
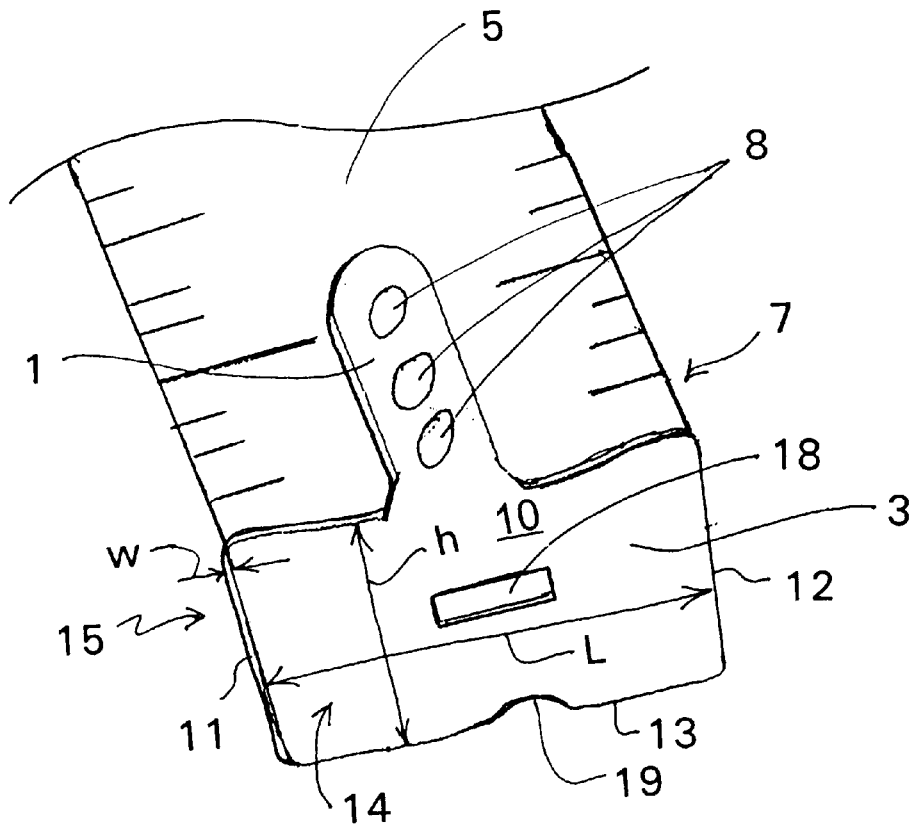
FIG. 2(*a*) is a perspective view of a conventional tape measure blade and blade catch attached thereto.
Figure 2B:
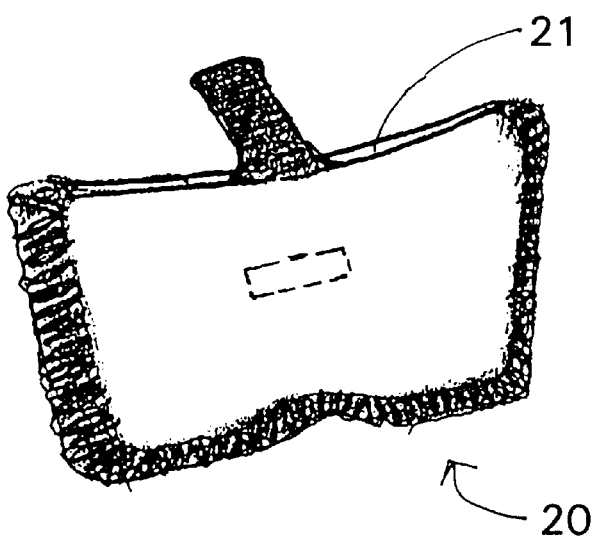
Figure 4:
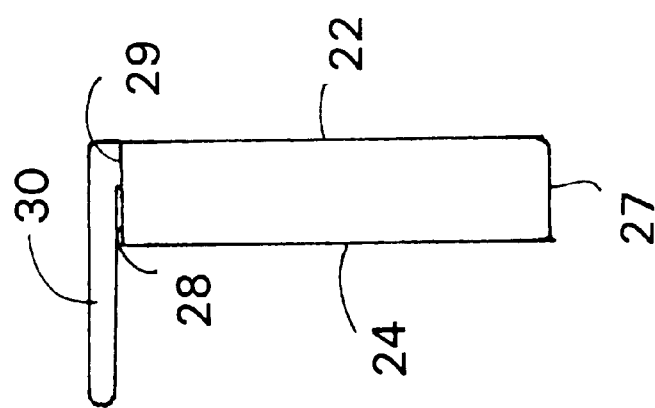
FIG. 4 is a elevational side view of the friction tab.
Figure 3:
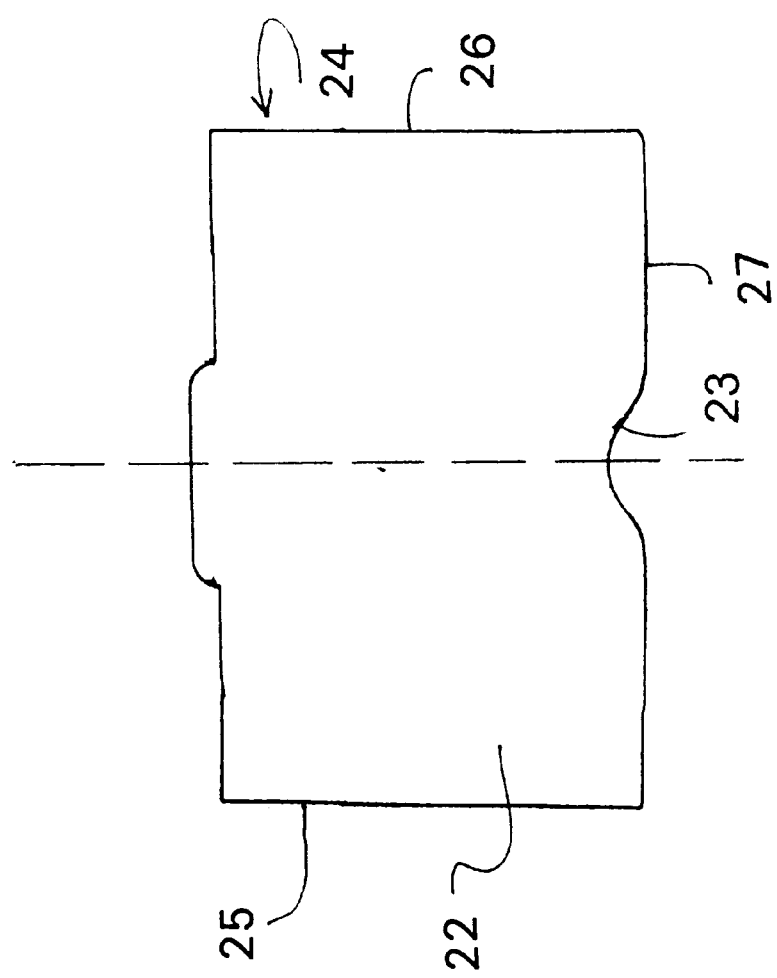
FIG. 3 is a front view of the friction tab.

Observing FIGS. 3 and 4, the sheath or pocket 21 is defined by a front wall 22 and a rear wall 24 substantially secured together around three mating or matching edges of the front wall 22 and the rear wall 24, namely a first side edge 25, a second side edge 26 and a bottom edge 27. A top edge of the tab is defined by edges 28, 29 of the front and rear walls 22, 24 respectively, remains. unsecured and separable from one another to define an opening into the pocket 21. The opening o and pocket 21 of the friction tab 20, as will be described in further detail below, accepts the depending portion of the blade catch 10 and frictionally engages the blade catch 10 to hold the friction tab 20 substantially affixed therewith.

Turning to FIGS. 5 and 6, the front wall 22 and the rear wall 24 are joined along the three edges, first side edge 25, second side edge 26 and the bottom edge 27. The front wall 22 and the rear wall 24 are inherently provided with a respective inner and outer front sides 32, 33 and an inner and outer rear sides 34, 35. The inner and outer walls 22, 24 are substantially affixed together along the first, second and bottom edges 25, 26 and 27 respectively such that the inner sides 32, 34 of the front and rear walls 22, 24 are substantially immediately adjacent each other. The separate top edges 28, 29 of the front wall 22 and the rear wall 24 are adjacent but unaffixed with one another to define the opening O into the pocket 21 of the friction tab 20. The inner sides 32, 34 of the front and rear walls 22, 24 as well as the respective first, second, bottom edges and top edges 25, 26, 27 and 28, and 29 thus substantially define the sheath or pocket 21 of the friction tab 20.

One of the top edges 28, 29 of either the front or rear wall 22, 24, preferably the top edge 29 of the front wall 22, may also be provided with a finger tab 30 to aid a user in the insertion and removal of the friction tab 20 from the blade catch 10. The finger tab 30 extends substantially perpendicular with respect to the planar orientation of the front and rear walls 22, 24 from the top edge 29 of the front wall 22, crossing the top edge 28 of the rear wall 24, and planarly engaging the first portion 1 of the blade catch 10 which attaches the blade catch 10 to the measuring blade 5.

The finger tab 30, which may substantially cover the rivets 8 attaching the first portion 1 of the blade catch 10 to the blade 5, is intended to also facilitate the opening of the pocket 21 and the insertion of the blade catch 10 through the opening O and between the front and rear walls 22, 24 as well as maintain the friction tab engaged with the blade catch 10 and also to assist in removal of the blade catch 10 from the pocket 21 if necessary.

Both the front wall 22 and the rear wall 24 and their respective inner sides 32, 34 in combination with the first, second and bottom edges 25, 26 and 27, define a volume V of the pocket 21 substantially conforming to the outer dimensions of the blade catch 36. is inserted. The volume V is in general conformity in size with the respective dimensions, i.e. a length L, height H and width W as defined by the front and rear faces 14, 15 and the first and second and bottom sides 11, 12 and 13 of the blade catch 10. The volume V may be formed of any particular size to accommodate the size of known tape catches 10 although it may be necessary to form the volume V slightly smaller than the dimensions of the blade catch 10 to facilitate the necessary frictional fit.

The friction tab 20 is in preferred forms of the invention fabricated from polymeric materials such as, rubber, plastic or similar materials having elastomeric properties which in combination with the above described conforming volume V of the pocket 21 facilitates a frictional fit between the respective engaging faces and edges of the catch 10 and the pocket 21. Essentially, the friction tab 20 is held by its own elastic frictional energy onto the blade catch 10.

Figure 7B:
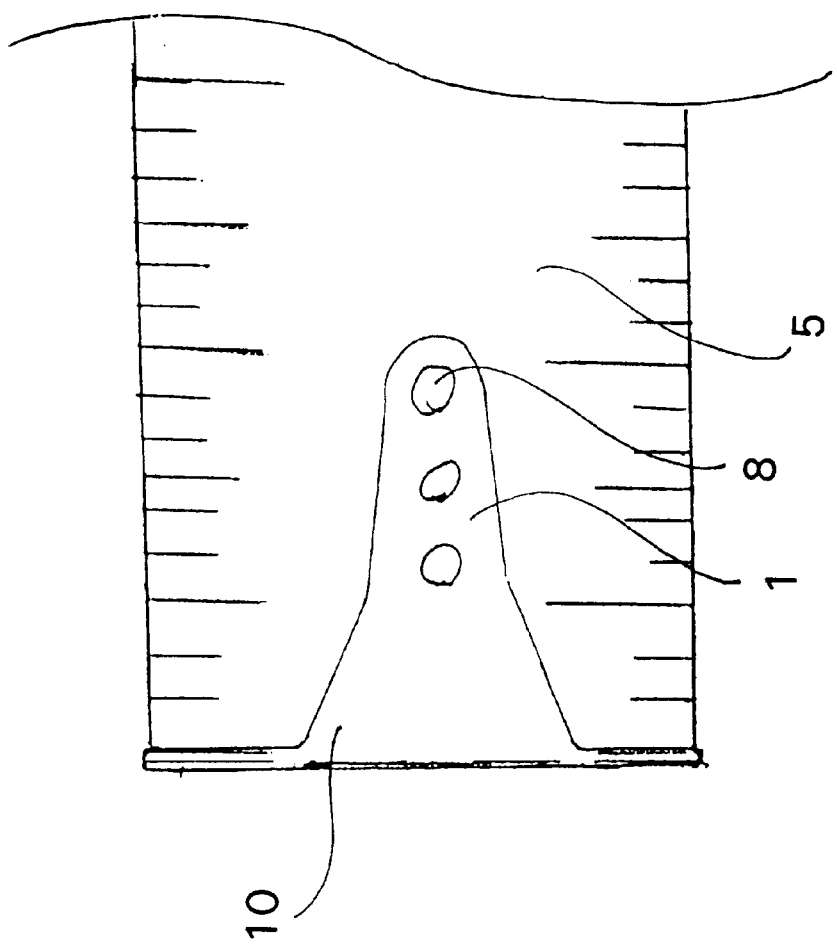
FIG. 7(*a*) is a top planar view of the blade catch measuring tape blade.
Figure 7A:
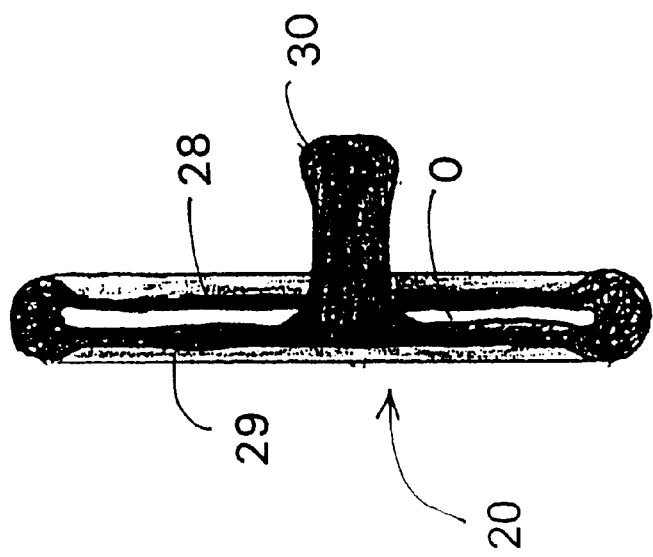
Figure 8A:
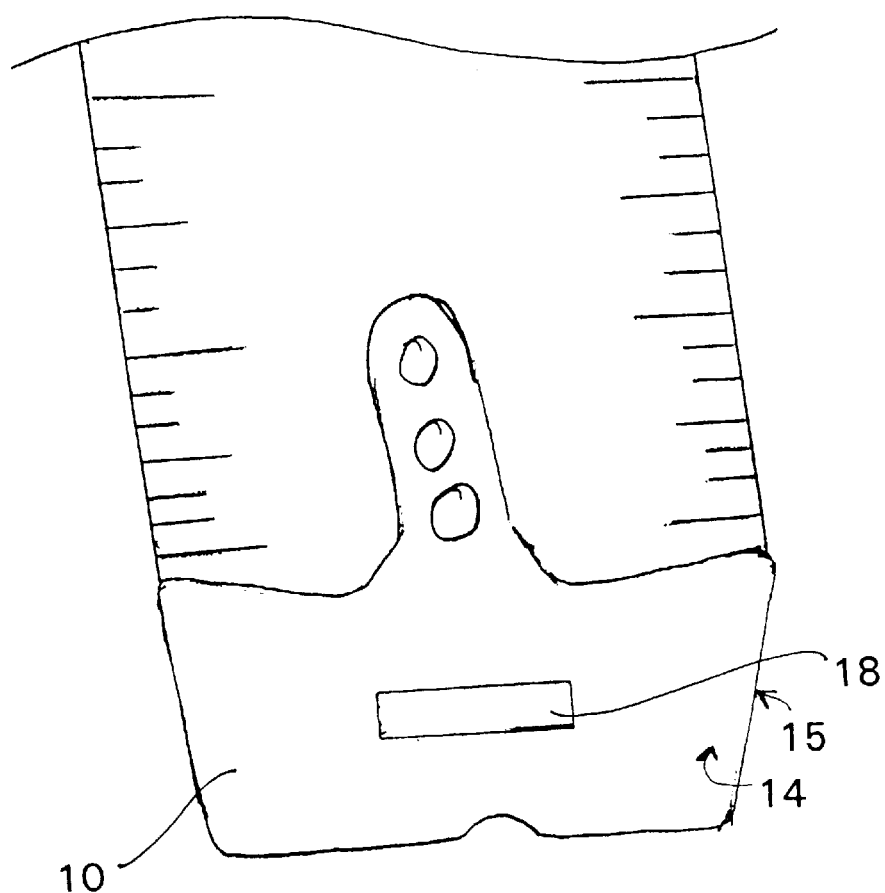
FIG. 8(*a*) is a perspective view of the blade and blade catch.
FIG. 8(b) is a cut open view of the interior portion of the friction tab.
Figure 8B:
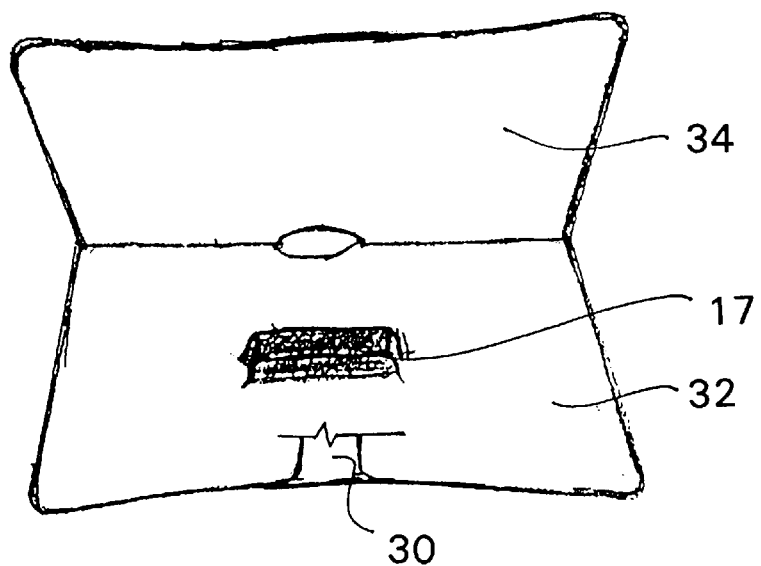

FIGS. 7 and 8, show a normal and a cut open view of the volume V respectively of the pocket 21. As is well known in the art, and as described above, the opening or detent 18 in the depending portion of the blade catch 10 may be provided through the front and rear faces 14, 15 of the blade catch 10. A protrusion 17 provided on one of the inner sides 32, 34 of the front and rear walls 22, 24, is designed to substantially engage the detent 18 in blade catch 10. The protrusion 17 is designed to fully engage and pass completely through the hole or opening 18 in order to provide a further mechanical engagement besides that of the frictional engagement between the pocket 21 and the edges and faces of the blade catch 10.

As is readily apparent to any person of ordinary skill in the art, the protrusion 17 could extend or be attached to the inner side of either the front or rear walls 22, 24 and extend into the detent 18. The protrusion 17 has a general size just smaller than the dimensions of the detent 18, to facilitate a relatively snug fit therewith.

In addition, as previously discussed, the bottom edge 27 of the friction tab 20 is provided with a tab indent 23 in order to substantially match a corresponding indent 19 of the blade catch or expose a portion of a bottom edge 13 of the blade catch 10 therein in order to facilitate the insertion and removal of the blade catch 10 from the friction tab 20. As can be appreciated, the tab indent 23 may be either joined along the edges, or not joined, to provide a second opening into the pocket 21 along the bottom edge 27 thereof.

The finger tab 30, in the present case shown attached to the front wall 22 of the friction tab 20, is shown extending perpendicularly from the front wall 22 and across the top edge 28 of the rear wall 24. The finger tab 30, as set forth above, is designed to facilitate the engagement and disengagement of the friction tab 20 with the blade catch 10 and, is a feature for providing further mechanical and frictional engagement between the blade catch 10 and the friction tab 2.

The blade catch 36 is, in general, provided with the first portion 1 being a rivet section extending substantially perpendicular to the face of the blade catch 10 in order to provide sufficient space and direction for the fastening of a number of rivets 8 to secure the blade catch 10 to the end of the blade 30. The rivets or pins 8 are usually located substantially adjacent the lead end 7 of the measuring blade to which the blade catch 10 is attached. Thus, the finger tab 30 is designed to substantially align and cover or protect the rivets 37 or pins securing the blade catch 10 to the blade 5 without blocking a user's view of the measurement units on the top surface of the blade 5.

Use of the blade catch 10 in conjunction with the friction tab 20 will now be described. The friction tab 20, which is in general produced and sold as an item either separate from or with the tape measure as a separable item, may be inserted over the blade catch 10 in the following manner. A user desiring to utilize the friction tab 20 on the blade catch 10 may squeeze the first and second side edges 25, 26, such that the opening to the pocket 21 is widened to accept at least the bottom edge 13 of the blade catch 10. Due to the elastomeric nature of the blade catch material, the finger tab 30 may be pulled back or rotated away from the opening during insertion of the blade catch 10, such that the finger tab 30 is out of the way and allows the face of the blade catch 10 to be inserted within the inner pocket 21. Due to the necessary frictional tight fit between the blade catch 10 and the inner pocket 21 of the friction tab 20, with a slight effort against this resilient frictional engagement, an operator or the user is able to situate the blade catch 10 within the inner pocket 21 of the friction tab 20 in a secure manner such that the two are not easily separated.

Once the friction tab 20 is essentially fitted over the blade catch 10, the protrusion 17 within the inner pocket 21 automatically engages with the detent 18 and the finger tab 30 also resiliently engages over the first portion of the blade catch 10 and the rivets 8 therein.

With the friction tab 20 thus engaging the blade catch 10, the user may hook the blade catch 10 over a desired edge 9 of an object from which a measurement is to be taken. The outer side 33 of the rear wall 24 engages at least a portion of the edge and provides a better frictional engagement due to the elastomeric properties of the friction tab 2 than would normally be had with the rear face 15 of the blade catch 10. As the user pulls the body 4 of the tape measure and thus extends the tape blade 5 from the body, despite any vertical or horizontal forces on the blade catch 10 produced by the user's movement of the tape measuring body 4 which might normally dislodge the blade catch 10 from the edge 9, the friction tab 20 facilitates the further frictional force between the blade catch 10 and the edge 9 from which the measurement is being taken.

Removal of the friction tab 20 from the blade catch 10 is essentially opposite to the procedure described above. As is readily apparent to those of ordinary skill in the art, the finger tab 30 is pulled back from the first portion of the blade catch 10 to assist in peeling off or removing, the friction tab 20 from the blade catch 10.

It is to be noted that the outer sides 33, 35 of the front and rear walls 22, 24 may be provided with any type of design or surface texture which would further frictionally assist the elastomeric outer surfaces of the tab 20 to remain engaged with an edge. For instance, the surface of the outer sides 33, 35 could be provided with a substantially non-planer bumpy or striated surface which might better engage an edge or object if made of particularly slippery or smooth material or when wet.

In a similar but often used configuration, for instance for measuring the inner diameter of a room, the outer side 33 of the front wall 22 is used to engage a surface, e.g. a corner of a room adjacent a floor or a ceiling along which a measurement is to be made by the user. Thus the outer side 33 of the front wall 22 should also be provided with substantial frictional engagement properties as those described above with regards to the rear wall. Thus, from all conventional measurement practices, the blade catch 10 is easier to maintain in its desired measurement position during measurement operations.

As this invention may be embodied in several forms without departing from the spirit or essential characteristics thereof, the present embodiments are therefore illustrative and not restrictive, since the scope of the invention is defined by the appended claims rather than by the description, and all changes that fall within the metes and bounds of the claims or that form their functional as well as conjointly cooperative equivalents, are therefore intended to be embraced by those claims.

What is claimed is:

1. A tape measuring apparatus including a measuring blade having a blade catch and a device cooperating with the blade catch for increasing the frictional resistance between the blade catch and a surface being engaged by the blade catch, the device comprising:

a resilient sheath defining a pocket having an interior volume;

the blade catch having an attachment portion for attachment of the blade catch to the measuring blade and a depending portion extending at a right angle from the attachment portion, the depending portion having a blade catch front face, a rear face, a first and second side edge and a bottom edge of desired dimensions;

the interior volume of the resilient sheath having a corresponding sheath front face, a rear face, first and second side edge and bottom edge of substantially the same dimensions as the blade catch dimensions;

wherein the resilient sheath is resiliently frictionally attached to the blade catch due to the substantially corresponding dimensions, and the sheath is formed from an elastomeric material and provided with dimensions smaller that the outer dimensions of the blade catch and the sheath and the blade catch of the measuring blade are held in substantial frictional engagement by elastic potential force of the sheath conforming the inner dimensions of the pocket to the outer dimensions of the blade catch and a front edge of the sheath is provided with a perpendicularly extending tab for engagement with the attachment portion of the blade catch.

2. The tape measuring apparatus as set forth in claim 1, wherein the sheath is provided with a protrusion within the sheath volume on the sheath front face for engaging a hole in the blade catch front and rear face of the depending portion of the blade catch.

3. The tape measuring apparatus as set forth in claim 1 wherein the bottom edge of the sheath is provided with a second opening to expose a portion of the blade facilitate the removal and insertion of the blade catch within the pocket and the exposing of a portion of the blade catch from such indentation.

4. A friction tab for increasing the friction between a measuring tape blade catch of a tape measure device and an engaged surface to ensure the measuring tape blade catch remains engaged during tape measure device operation, the friction tab comprising:

a front wall and a rear wall adjacently joined along at least a portion of a first, second and third edge to define a pocket between the front and rear wall;

adjacent respective fourth edges of said front and rear walls being unattached to define an opening into the pocket;

one of the front and rear walls having a first projection formed on an inner side thereof within the pocket for engagement with a detent formed in the measuring blade catch of the tape measure; and wherein the respective fourth edge of the front wall is provided with a second projection extending transversely from the fourth edge of the front wall and across the respective fourth edge of the rear wall.

5. The friction tab as set forth in claim 4, wherein the second projection transversely extending from the respective fourth edge of the front wall extends across the opening and past the fourth edge of the rear wall to engage an attachment portion of the measuring blade catch.

6. The friction tab as set forth in claim 4, wherein the pocket bounded by the front and rear walls and first, second, third and fourth edges defines a volume having inner dimensions substantially the same as corresponding outer dimensions of a portion of an engagement portion of the blade catch.

7. The friction tab as set forth in claim 4, wherein an outer surface of the front and rear walls is provided with a textured surface to facilitate the adherence of the blade catch to the engaged surface.

8. The friction tab as set forth in claim 6, wherein the friction tab is composed of a resilient flexible material.

* * * * *